Feb. 23, 1954 J. G. CAPSTAFF 2,670,312
APPARATUS AND METHOD FOR MOTION-PICTURE COLOR PHOTOGRAPHY
Filed Aug. 24, 1950 2 Sheets-Sheet 1

John G. Capstaff
Inventor

By Daniel J. Mayne
Frank R. Gollon
Attorneys

Feb. 23, 1954    J. G. CAPSTAFF    2,670,312
APPARATUS AND METHOD FOR MOTION-PICTURE COLOR PHOTOGRAPHY
Filed Aug. 24, 1950    2 Sheets-Sheet 2

John G. Capstaff
INVENTOR.

BY Daniel I. Mayjue
Frank R. Dollor
ATTORNEYS

Patented Feb. 23, 1954

2,670,312

UNITED STATES PATENT OFFICE 2,670,312

APPARATUS AND METHOD FOR MOTION-PICTURE COLOR PHOTOGRAPHY

John G. Capstaff, Rochester, N. Y., assignor to Eastman Kodak Company, Rochester, N. Y., a corporation of New Jersey Application August 24, 1950, Serial No. 181,222

Claims priority, application France August 31, 1949

6 Claims. (Cl. 154—98)

The present invention relates to an apparatus and process for the successive transfer to separate film supports of two or more emulsion layers from a film carrying originally in superposition a plurality of emulsion layers separated by water-permeable interlayers which permit the individual stripping of the upper emulsion layers and their transfer to separate film supports to which they are individually bonded.

In United States Patents No. 2,417,060 and No. 2,611,686, granted to me, respectively, March 11, 1947, and September 23, 1952, there is disclosed apparatus for carrying out such a stripping and transfer operation. As there described, the topmost emulsion layer is stripped from the original multilayer film and transferred to a separate film support, after which the stripped multilayer film carrying the remaining emulsion layers is dried and the multilayer film then submitted to a similar operation for the stripping and transfer of the next emulsion layer.

In accordance with the present invention, the multilayer film is not dried after the first stripping operation but is immediately carried to a second stripping device similar to the first, and the operation repeated. Moreover, the stripping itself is performed under water rather than in the open air. I have found that by stripping under water and then proceeding immediately to the second operation of pressing the stripped multilayer film into contact with a second film support or transfer film and registering these two films, as will be subsequently described, this whole operation taking place while the multilayer film remains submerged in the water bath, the danger of trapping air bubbles between the stripped multilayer film and second film support is precluded. Furthermore, in the apparatus disclosed in the above patents those portions of the interlayer which still adhered to the surface of the stripped multilayer film became more or less hardened and were not readily removed even with a vigorous scrubbing or cleaning, as was provided in these devices by scrubber or wiper rolls. In the apparatus embodying the present invention I include a cleaning device which is similarly submerged in the water bath. Since this device operates upon the stripped multilayer film in the interim between the stripping of the top emulsion layer and the subsequent pressing of the stripped multilayer film upon a second transfer film, the multilayer film remains wet and the adhering particles of interlayer have not become hardened by drying and, being soft, they are readily removed by the cleaning operation.

It is, therefore, an object of this invention to provide an apparatus and process of the character described in which the stripping of the uppermost emulsion layer of a multilayer film and the transfer film to which this has been bonded is performed while submerged in a bath and in which the stripped multilayer film is passed without removal thereof from the bath to the next station at which it is pressed, while still submerged, into contact with a second transfer film.

It is a further object of this invention to provide an apparatus and process of the character described in which the subsequent cleaning of portions of the adhesive interlayer from the freshly stripped surface of the multilayer film is performed while this film is still submerged after the completion of the stripping of the topmost emulsion layer from the multilayer film.

Other objects and advantages of this invention will become apparent from the following description taken in connection with the accompanying drawing and it will be understood that many changes may be made in the details of construction, arrangement of parts and in the method shown and described without departing from the spirit of the invention as expressed in the accompanying claims. I, therefore, do not wish to be limited to the exact details shown and described, as the preferred form only has been shown by way of illustration.

In the drawings:

Fig. 1 is a diagrammatic view of an apparatus embodying the present invention, the details of which have been omitted as unnecessary for an understanding of the invention herein described. Such details as the driving means for the several sprockets and socket rollers, the supports for these, the several rollers, and other such mechanical details are not shown, but these may be readily understood from an inspection of the patents above referred to.

Figure 1:
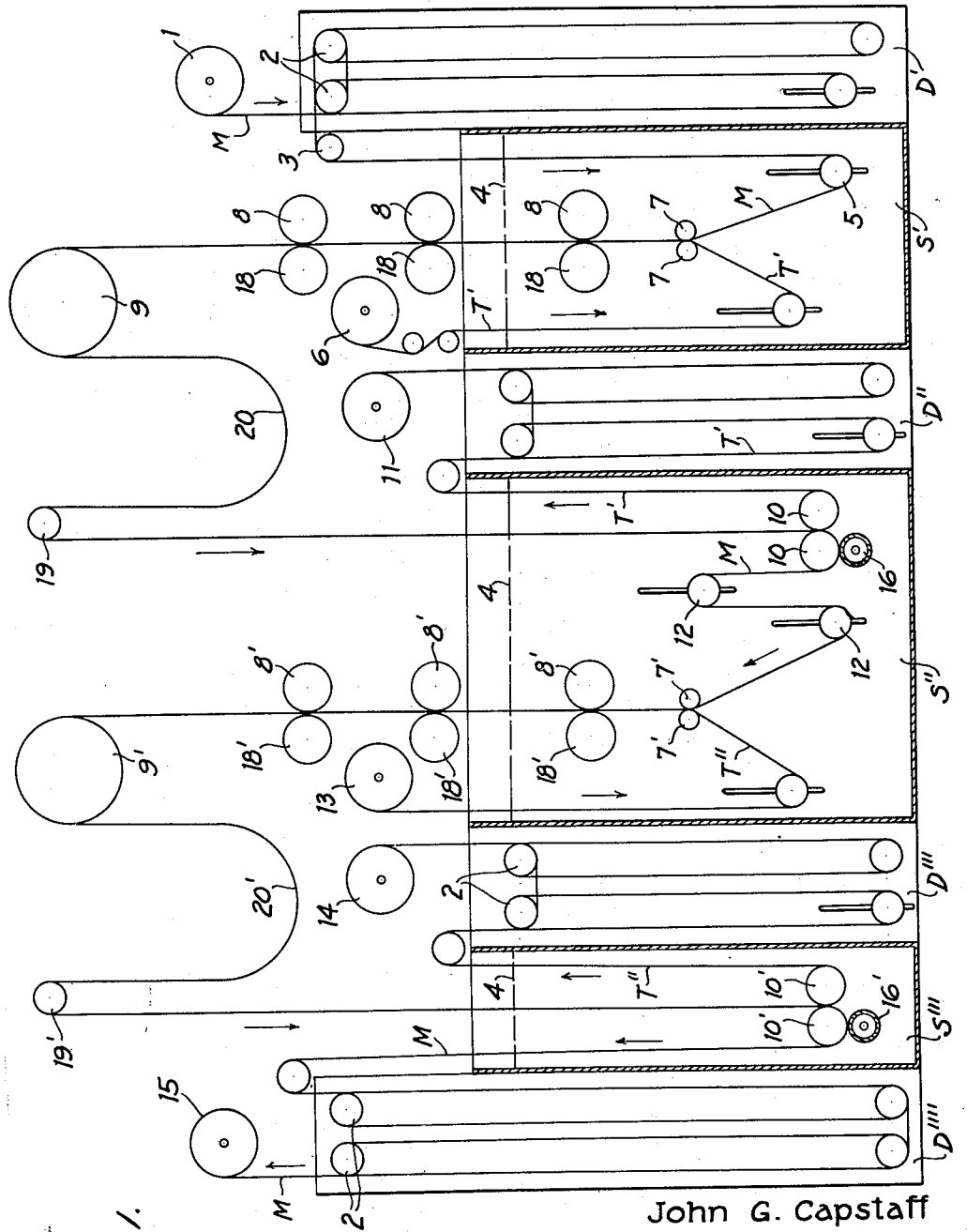
Figure 2:
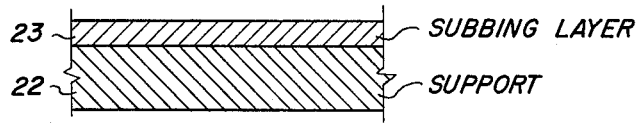
Fig. 2 is an enlarged cross-sectional view of the transfer films T' and T''.
Figure 3:
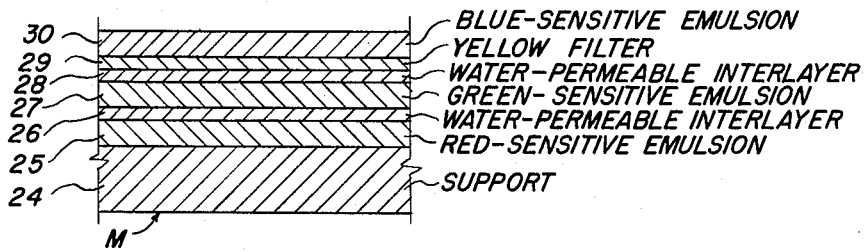
Fig. 3 is an enlarged cross-sectional view of the multilayer film M.

The specific construction of the multilayer film M and the transfer films T' and T'' forms no part of the present invention. Although such films are described and illustrated in my Patent No. 2,417,060, referred to above, a brief description is included herein in order that the present invention may be more readily understood. The multilayer film M, as seen in Fig. 3, includes a plurality of superposed emulsion layers positioned upon the film base or support 24. The emulsion layers are preferably three in number, the uppermost 30 being blue sensitive, the next 27 being green sensitive, and the one 25 adjacent to the film base being red sensitive. The emulsion layers are separated from each other by water-permeable interlayers 26 and 28, the wetting of which destroys the bond between an interlayer and the superposed emulsion layer to permit the ready stripping of the latter from the multilayer film. By adjusting the wetting time the bond between the uppermost of the two interlayers and the overlying emulsion layer can be destroyed without similarly affecting the bond between the lower interlayer and the emulsion layer overlying it. It has also been found expedient to interpose a yellow filter 29 between the blue-sensitive emulsion layer and the green and red-sensitive emulsion layers lying thereunder to filter out the blue light to which the green and red-sensitive emulsion layers are ordinarily also sensitive. The transfer films T' and T'' are unsensitized and include the film base or support 22 and an overlying subbing layer 23 as seen in Fig. 2.

The multilayer film M with its plurality of emulsion layers is fed from a suitable supply roll 1 through a conditioning chamber D' in which the humidity and temperature are controlled so that the film will be restored as nearly as possible to its dimensional condition at the time of its manufacture. Suitable sprockets 2, some of which are positionally adjustable, are provided for passing the film in loops through this conditioning chamber and through other units of the apparatus, the length of the paths in the various units being thus adjustable. As the film leaves the conditioning chamber D' it passes over the guide means 3 and into the tank S' which is filled with water to a level indicated at 4. Guide means 5, positioned in the tank and comprising a roller adjustably mounted in a slot, furnishes means for adjusting the length of path within the bath. The first film support or transfer film T' is supplied from a roll 6 and also passes into the tank S'. The two films M and T' are directed to the pressure means which comprises a pair of pressure rollers 7 which press the films into intimate contact. The films then pass between a series of sprockets 8 and coacting socket rollers 18 which register the superposed films and maintain these under tension to preserve the registration in the intervals of travel between the sprockets despite small differences in the dimensions of the two films. As illustrated, the pressure rollers 7 are so located that the films are passed between them before they reach the first of the registering sprockets. This structure is shown in detail in my Patent No. 2,611,686, but it is to be understood that the apparatus of my Patent No. 2,417,060, in which the multilayer and transfer films are pressed into intimate contact after they pass over the first of the registering sprockets, may be utilized in carrying out my invention.

Figure 4:
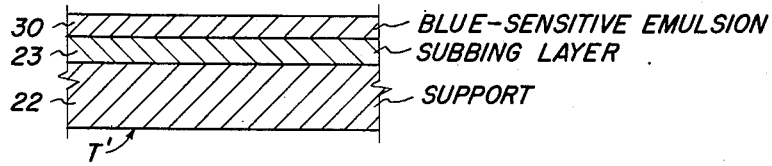
Fig. 4 is a similar view of the transfer film T' after the blue-sensitive emulsion layer has been bonded thereto.
Figure 5:
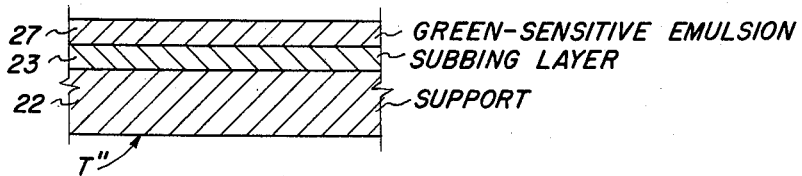
Fig. 5 is a similar view of the transfer film T'' after the green-sensitive emulsion layer has been bonded thereto.

The upper emulsion layer 30 of the multilayer film becomes initially bonded to the transfer film as the films pass between the series of sprockets 8 and this bonding is completed as they pass over the sheave 9 and roller 19. Between the sheave 9 and roller 19 the films hang in a loop 20 whose length may be adjusted to vary the bonding time. The films then pass to a second tank S'' where they are again submerged below the level 4 of a second bath and stripped while submerged as they pass the stripping rollers 10. The transfer film T' to which is now bonded the blue-sensitive emulsion 30, as illustrated in Fig. 4, passes through a drying chamber D'', after which it is wound upon the spool or roll 11. The multilayer film, now carrying the red-sensitive and green-sensitive emulsion layers, while still submerged passes over the rollers 12, at least one of which is adjustable. A second transfer film T'' supplied from the roll 13 passes into the tank S'' and is directed with the film M between the pressure rollers 7' to sprockets 8' and socket rollers 18' which are similar in every way to those associated with the first tank S'. The top emulsion layer 27 (green-sensitive) of the film M is bonded to the transfer film T'' as the two films pass over the sheave 9' in an adjustable loop 20' and over the roller 19' and thence to the stripping rollers 10' which are submerged below the bath level 4 in tank S'''. At the stripper 10' the films are stripped apart, and the film T'' now carrying the second or green-sensitive emulsion layer 27, as illustrated in Fig. 5, passes into the drying chamber D''' and thence to the takeup spool or roll 14. The film M, now bearing only the bottommost of the original three emulsion layers, i. e. the red-sensitive layer, passes through the drier D'''' and to the takeup roll 15 upon which it is wound.

It is thus apparent that by means of the above-described apparatus and process I preclude the possibility of entrapping air bubbles between the surface of the freshly stripped multilayer film and the next transfer film by stripping under water and then pressing these two films into intimate contact before the multilayer film is passed above the level of the bath. In addition to other advantages which are inherent in the simplification of the apparatus and process and in the smaller dimensions of the apparatus, there is a further important advantage obtained by the use of my invention. Hitherto after the first stripping operation, when the multilayer film had been dried, any portions of the interlayer 28 which remained attached to it became more or less hardened and were difficult of removal even though submitted to a vigorous scrubbing or cleaning operation, provided by brushes or rollers covered with viscose sponge or chamois, rotated in a direction opposite to the travel of the film. If the scrubbing or cleaning is done immediately after the stripping while the multilayer film is still submerged in the bath and has not been hardened through drying, such residual portions of the interlayer are still soft and are readily removable. Accordingly, I have inserted cleaning rollers 16 and 16' in the tank below the level of the bath and in close proximity to the stripping rollers. The peripheries of the rollers 16 and 16' may comprise brushes or coverings of felt, viscose sponge, chamois, or other materials familiar to those skilled in the art. In addition, water may be introduced through the center of the rollers and forced outwardly through the brushes or other porous covering to insure a more thorough cleaning of the surface of the film. As an alternative, I may employ jets instead of scrubbing rollers to remove residual portions of the interlayer, but these too would be submerged in order that the cleaning operation might be performed before these portions of the interlayer had hardened by drying.

Although my invention is described in connection with an apparatus in which the films are registered and maintained in registration by tensioning the films between a series of sprockets, it is to be understood that my invention is applicable to other forms of stripping apparatus, such as those shown in United States Patent No. 2,369,176, granted to G. F. Rackett February 13, 1945 and in British patent No. 574,164, granted to Kodak Limited et al. and accepted December 21, 1945. In the latter United States patent the superposed films are registered upon an endless pin belt, in the British patent upon a sprocket wheel. To adapt either of these devices to applicant's invention requires that instead of performing the stripping in the air, as disclosed in the patents, this operation be carried out while submerged in a bath, after which the stripped multilayer film proceeds while remaining submerged to the next station at which a second transfer film is pressed into intimate engagement with the multilayer film. In other words, the drying operation performed upon the freshly stripped multilayer film in each patent is omitted and this film after being stripped continues to the second station where it is pressed into contact with the second transfer film while still submerged.

From the foregoing description it will be apparent that I have provided means and method for obtaining all of the objects and advantages of this invention.

What I claim and desire to secure by Letters Patent of the United States is:

1. The process of transferring successively to two separate unsensitized transfer films two emulsion layers from a multilayer film having a plurality of emulsion layers thereon separated by adhesive interlayers by an operation which comprises submitting the multilayer film to a bath which softens the topmost interlayer and renders the uppermost emulsion layer adhesive, pressing the first transfer film into contact with the multilayer film and securing these in registration until the top emulsion layer is firmly adherent to the transfer film, and then stripping the transfer film with the topmost emulsion layer adhering thereto from the multilayer film, characterized by performing the stripping operation while the films are submerged in a bath and without removal of the stripped multilayer film from the bath passing the latter film to the next station at which it is pressed, while still submerged, into contact with the second transfer film.

2. A process according to claim 1 characterized in that the multilayer film is submitted after the stripping operation and while the film is still submerged in the bath to a cleaning operation to remove from the freshly stripped surface any portions of the adhesive interlayer that may remain thereon.

3. A process of transferring successively to two separate unsensitized transfer films two emulsion layers from a multilayer film having a plurality of emulsion layers thereon separated by adhesive interlayers comprising submitting the multilayer film to a bath which softens the topmost interlayer and renders the uppermost emulsion layer adhesive, pressing the first transfer film into contact with the multilayer film while the two films are submerged in said bath and securing said films in registration until the transfer film becomes adherent to the topmost emulsion layer, removing said films from said bath and, after said transfer film has become firmly bonded to the topmost emulsion layer, again submerging the films in a bath and stripping the transfer film with the emulsion layer adhering thereto from the multilayer film while the films are submerged in the bath, passing the stripped multilayer film to the next station without removal of the latter film from the bath, pressing at said station the multilayer film, while still submerged, and the second transfer film into contact, and registering the same.

4. A process according to claim 3 in which the multilayer film is submitted to a cleaning operation immediately after the stripping operation and while the film is still submerged in the bath to remove from the freshly stripped surface any portions of the adhesive interlayer that may remain thereon.

5. In an apparatus for transferring successively to two separate unsensitized transfer films two emulsion layers from a multilayer film having a plurality of emulsion layers thereon separated by adhesive interlayers, a tank adapted to contain a bath at a predetermined level, a stripper positioned in said tank below the bath level adapted to strip a transfer film and the top emulsion layer bonded thereto from a multilayer film, pressure means positioned in said tank below the bath level for bringing the stripped multilayer film into intimate contact with a second transfer film, roller means for conveying the stripped multilayer film from the stripper to the pressure means while the film remains submerged, and means for registering the stripped multilayer film and second transfer film and maintaining these in registration until the second transfer film becomes adherent to the topmost emulsion layer of the stripped multilayer film.

6. An apparatus according to claim 5 in which a cleaning device is positioned in said tank below the bath level, which device is adapted to remove from the freshly stripped surface of the multilayer film as it is conveyed from the stripper to the pressure means any portions of the adhesive interlayer that may remain on said film.

JOHN G. CAPSTAFF.

References Cited in the file of this patent

UNITED STATES PATENTS

| Number | Name | Date |
|---|---|---|
| 2,369,176 | Rackett | Feb. 13, 1945 |
| 2,415,442 | Rackett | Feb. 11, 1947 |
| 2,417,060 | Capstaff | Mar. 11, 1947 |
| 2,551,689 | Miller | May 8, 1951 |

FOREIGN PATENTS

| Number | Country | Date |
|---|---|---|
| 582,436 | Great Britain | Nov. 15, 1946 |